United States Patent [19]

Bowman

[11] 3,831,141
[45] Aug. 20, 1974

[54] ALARM CIRCUIT
[75] Inventor: Richard J. Bowman, Croswell, Mich.
[73] Assignee: W. M. Vick, Warren, Mich.
[22] Filed: Aug. 31, 1972
[21] Appl. No.: 285,449

[52] U.S. Cl............ 340/63, 307/10 AT, 340/248 B, 340/249
[51] Int. Cl...................... B60r 25/00, G08b 13/00
[58] Field of Search......... 340/63, 248 B, 249, 276, 340/64, 253 P; 307/10 AT, 255; 180/114

[56] References Cited
UNITED STATES PATENTS
| | | | |
|---|---|---|---|
| 3,189,788 | 6/1965 | Cady | 340/248 B |
| 3,197,690 | 7/1965 | Ball | 307/255 |
| 3,533,064 | 10/1970 | Perelman | 340/276 |
| 3,614,734 | 10/1971 | Davis | 340/63 |

Primary Examiner—John W. Caldwell
Assistant Examiner—Joseph E. Nowicki
Attorney, Agent, or Firm—J. King Harness

[57] ABSTRACT

An alarm system particularly suited for detecting unauthorized entry into a vehicle having one or more load circuits which are energized by the vehicle battery when such entry is attempted. When the system is armed, battery voltage is continuously monitored against a reference voltage previously derived from the battery. The enrgization of one of said circuits causes a sudden drop in battery voltage and hence, a differential voltage between the battery and reference voltages. This differential voltage causes an alarm signal to be generated.

23 Claims, 4 Drawing Figures

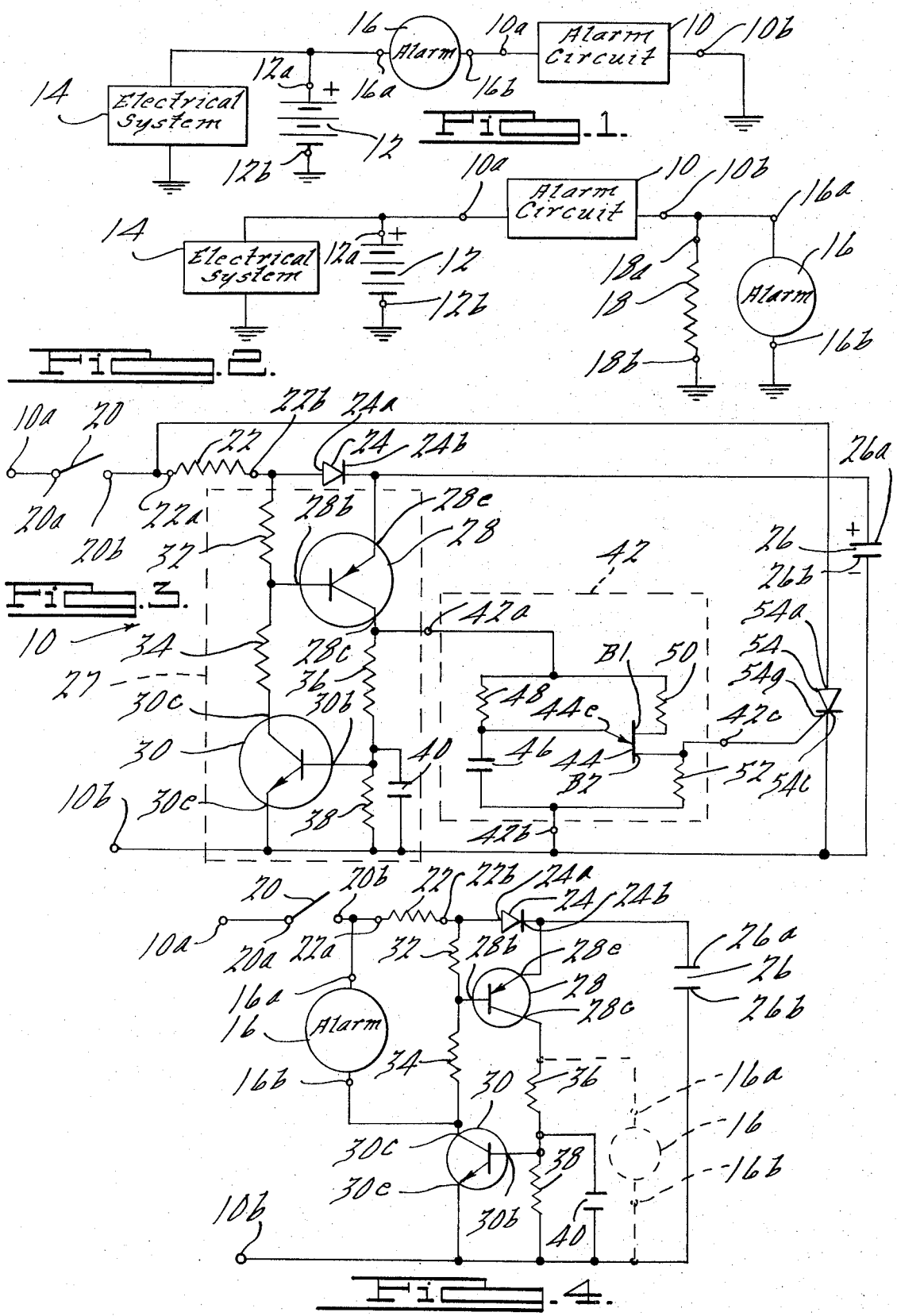

3,831,141

ALARM CIRCUIT

BACKGROUND AND SUMMARY OF THE INVENTION

This invention relates to an alarm system particularly suited for use with automotive vehicles. More specifically the invention relates to a solid state alarm circuit embodying novel operating concepts and possessing at least several important advantages over prior solid state alarm circuits.

Undesirable features of prior alarm circuits include: the use of a relatively large number of individual circuit elements, which tends to increase both the cost of the alarm and the probability of system failure due to failure of individual circuit elements; consumption of power by the alarm circuit during monitoring; and poor temperature stability which increases the probability that a spurious alarm signal will be generated.

The present invention solves these problems by using a relatively small number of circuit elements arranged to operate in a fashion which reliably warns against intruders; which consumes essentially zero power during monitoring; and which is substantially temperature insensitive within the wide temperature range to which the alarm circuit may be subjected.

Additional objects of the present invention are to provide an alarm circuit: which can be packaged as a small compact unit for concealment in a vehicle; which can be easily connected in the existing electrical circuit of the vehicle; which allows an authorized person both sufficient time to leave the vehicle after switching on the alarm circuit and sufficient time to switch off the alarm circuit upon reentering the vehicle without an alarm being sounded; and which, once it has been triggered by an intruder can be turned off only by locating the control switch and turning it off or by disconnecting the battery from the electrical system.

Further objects and advantages of the invention will be seen in the ensuing description and claims which are to be taken in conjunction with the accompanying drawing.

DESCRIPTION OF THE DRAWING

The drawing illustrates a preferred embodiment of the invention in accordance with the best mode presently contemplated for carrying out the invention.

FIG. 1 is a schematic block diagram illustrating the connection of the alarm circuit of the present invention in one type of vehicle circuit.

FIG. 2 is a schematic block diagram illustrating the connection of the alarm circuit in another type of vehicle circuit.

FIG. 3 is an electrical schematic circuit diagram illustrating one form of alarm circuit according to the present invention.

FIG. 4 is an electrical schematic diagram illustrating another form of alarm circuit according to the present invention.

DESCRIPTION OF THE PREFERRED EMBODIMENT

The particular alarm device employed in conjunction with the alarm circuit of the invention may be of any suitable type, but, it is usually desirable to use the existing horn circuit of the vehicle so that the alarm circuit operates to sound the horn when attempted entry of an intruder is detected. Accordingly, FIG. 1 illustrates the connection of the alarm circuit 10 of the present invention when the horn circuit has a horn relay with one terminal of the relay coil connected to the ungrounded battery terminal and the other coil terminal connected via the horn switch to ground. The vehicle battery 12 supplies power for the vehicle electrical system 14, the particular system shown being of the negative ground type (i.e., the negative battery terminal 12b being connected to ground). An alarm 16 represents the horn relay coil with alarm terminal 16a corresponding to one terminal of the coil and alarm terminal 16b corresponding to the other terminal of the coil. Terminal 16a is connected to the positive battery terminal 12a, and terminal 16b, to one terminal 10a of alarm circuit 10. The other terminal 10b of alarm circuit 10 is connected to ground. The horn switch (not shown is connected between terminal 16b and ground (i.e., in parallel with alarm circuit 10) and the horn relay contacts (not shown) are connected in series with the horn (not shown) and battery 12. When alarm circuit 10 has detected attempted unauthorized entry into the vehicle, it operates to substantially short circuit terminals 10a and 10b thereby energizing the horn relay coil to in turn sound the horn. In a circuit where the horn switch is connected between the ungrounded battery terminal and the coil of the horn relay, alarm circuit 10 would still be connected in parallel with the horn switch.

In FIG. 2, the connection of alarm circuit 10 is illustrated for a horn circuit which does not have a horn relay. The horn switch contacts are connected between the ungrounded battery terminal and the battery terminal of the horn. Terminals 16a and 16b represent respectively the battery and ground terminals of the horn itself. Terminal 10a of alarm circuit 10 is connected to battery terminal 12a while terminal 10b is connected to alarm terminal 16a so that alarm circuit 10 is connected in parallel with the horn switch (not shown). Terminal 16b is connected to ground. In the usual type of automobile horn, energization of the horn causes the circuit between the terminals 16a and 16b to be intermittently interrupted. Hence, for reasons which will be explained later, an additional circuit component in the form of a resistor 18 having terminals 18a and 18b is connected between terminal 10b and ground, and this permits alarm circuit 10 to be used where the vehicle has no horn relay. While resistor 18 has been illustrated as separate from alarm circuit 10, it will be appreciated that resistor 18 could be packaged therewith for connection when needed. Alarm circuit 10 operates upon detection of an intruder to substantially short circuit terminals 10a and 10b thereby directly energizing the horn from battery 12. In a horn circuit where the horn switch is connected on the ground side of the horn, rather than on the battery side, alarm circuit 10 would be still connected in parallel with the horn switch and resistor 18 in parallel with the horn. It will also be appreciated that where alarm circuit 10 is used with a separate alarm other than the horn, terminals 10a and 10b can be connected directly to battery 12 provided that the alarm circuit is modified to operate by supplying a signal to the alarm, rather than by shorting terminals 10a and 10b.

Regardless of which type horn circuit is connected with alarm circuit 10, the novel operating concepts embodied in alarm circuit 10 are the same. Hence, turning to the circuit details of alarm circuit 10 in FIG. 3, a series circuit consisting of a normally open on-off switch 20, a resistor 22, a diode 24, and a capacitor 26 is connected between terminals 10a and 10b. Terminal 10a is connected to terminal 20a of switch 20, and terminal 20b of switch 20 is in turn connected to terminal 22a of resistor 22. Terminal 22b of resistor 22 is connected to the anode terminal 24a of diode 24 and the cathode terminal 24b of diode 24 is connected to the positive plate 26a of capacitor 26. Plate 26b of capacitor 26 is connected to terminal 10b. As seen in FIGS. 1 and 2, terminals 10a and 10b are connected via alarm 16 across battery 12 so that when switch 20 is closed, charging current is supplied from battery 12 through alarm 16, switch 20, resistor 22 and diode 24 to charge capacitor 26 to the illustrated polarity with plate 26a positive with respect to plate 26b. Resistor 22 is selected to limit this charging current to a level which insures against alarm 16 being actuated during this time. When capacitor 26 has been fully charged, the flow of charging current ceases and the capacitor voltage is approximately equal to the voltage of battery 12. (In view of the preferred method, hereinafter explained, for arming alarm circuit 10, resistor 22 does not necessarily have to be large enough to provide any appreciable time delay in charging capacitor 26; in fact, it is typically desirable to make resistor 22 as small as possible for reasons hereinafter explained.)

The vehicle electrical system 14 includes one or more load devices (not illustrated) which are energized by battery 12 when unauthorized entry into the vehicle is attempted. Such devices may be, for example, dome, hood, or trunk lamps, which are connected to battery 12 via switches which are tripped upon opening a door, the hood, or the trunk. Energization of any one of these devices creates a sudden drop in battery voltage of relatively substantial value (i.e., somewhat on the order of several volts) and the advantages of one aspect of the invention arise through recognition of this phenomenon. Because diode 24 prevents the voltage of capacitor 26 from following this sudden change in battery voltage, a reverse voltage is developed across diode 24 (i.e., cathode 24b becomes positive with respect to anode 24a) when one or more of these load devices is energized. Hence, in contrast to previous alarm circuits which use an amplifying circuit coupled directly across the battery to amplify battery voltage fluctuations, the present invention through recognition of the above phenomenon eliminates the need to have an amplifying circuit coupled across the battery. As a result, the alarm circuit of the invention does not draw bias current from the battery during monitoring as is done by an amplifying circuit connected across the battery. Therefore, the present alarm circuit can monitor for an extended time period. Moreover, the present invention lacks the temperature instability and drift problems which are inherent in cheaper amplifying circuits and which require additional circuitry in the more expensive amplifying circuits to compensate for these problems.

A detection circuit 27 is operatively associated with the series circuit just described and detects the reverse voltage developed across didoe 24 as a result of attempted unauthorized entry. Detection circuit 27 comprises a PNP transistor 28, a NPN transistor 30, resistors 32, 34 36 and 38, and a capacitor 40. Transistor 28 comprises an emitter terminal 28e connected to the junction of terminals 24b and 26a, a base terminal 28b connected through resistor 32 to the junction of terminals 24a and 22b, and a collector terminal 28c connected through the series combination of resistor 36 and resistor 38 to terminal 10b. Capacitor 40 is connected in parallel with resistor 38. Transistor 30 comprises a base terminal 30b connected to the junction of resistors 36 and 38, a collector terminal 30c connected through resistor 34 to base terminal 28b of transistor 28 and an emitter terminal 30e connected to terminal 10b.

Detection circuit 27 operates as follows. When reverse voltage across diode 24 is developed, the emitter-base junction of transistor 28 becomes forwardly biased rendering transistor 28 conductive. Initial emitter current in transistor 28 is drawn from capacitor 26. This emitter current divdes within transistor 28 into base current and collector current. The base current flows through resistor 32, resistor 22, and switch 20 back through battery 12 and alarm 16 to capacitor 26. The collector current flows through resistor 36 and divides between resistor 38 and capacitor 40 to flow back to capacitor 26. The collector current flow through resistor 36 and into resistor 38 and capacitor 40 has two effects. First, it immediately creates a positive voltage at terminal 28c. Second, it begins to develop increasing voltage at terminal 30b which begins to forward bias the base-emitter circuit of transistor 30. As is result, transistor 30 becomes increasingly conductive. The increasing conduction of transistor 30 tends to create current flow from battery 12 through resistors 22, 32 and 34 and the collector-emitter circuit of transistor 30. This current flow from battery 12 opposes the base current flow from transistor 28 back through the battery so that base current flow from transistor 28 changes from its initial path through resistors 32 and 22 and battery 12 to a new path through resistor 34 and the collector-emitter of transistor 30. Concurrently the voltage at terminal 28b drops appreciably and this tends to increase the forward bias across the emitter-base junction of transistor 28 thereby increasing, or at least maintaining, the intiial conduction of transistor 28. Hence, transistor 30 is arranged to have a regenerative effect on transistor 28. Basically circuit 27 is bi-stable, switching from an inactive to an active state when triggered by reverse voltage across diode 24. As charge is depleted from capacitor 26 and as the drop in battery voltage caused by the attempted entry of the intruder dissipates, the reverse voltage across diode 24 likewise dissipates. However, emitter current for transistor 28 is now supplied from battery 12 via diode 24. Thus, once one of the vehicle load circuits has been even momentarily energized, detection circuit 27 rapidly switches from its inactive state, wherein transistors 28 and 30 are non-conducting, to its active state, wherein the two transistors are conducting. Thus, circuit 27 prevents the intruder from foiling the alarm by quickly reclosing the portion of the vehicle which he has opened. The only way to unlatch circuit 27 form this second state is by either disconnecting battery 12 or opening switch 20, and with alarm circuit 10 well hidden this makes disarming of the alarm extremely difficult for the intruder once he becomes aware that the alarm has been given.

A time delay circuit 42, having terminals 42a, 42b and 42c is operatively coupled with the detection circuit. Terminal 42a is connected to terminal 28e and terminal 42b to terminal 10b. Time delay 42 provides a delayed output signal across terminal 42b and 42c a certain time after a positive voltage is applied across terminals 42a and 42b. One suitable construction for circuit 42 comprises a unijunction transistor 44, a capacitor 46 and resistors 48, 50 and 52. Resistor 48, capacitor 46 are connected in series between terminals 42a and 42b. Transistor 44 comprises an emitter terminal 44e connected to the junction of resistor 48 and capacitor 46, a B1 terminal connected through resistor 50 to terminal 42a and a B2 terminal connected through resistor 52 to terminal 42b. Terminal 42c is connected to the B2 terminal of transistor 44. When positive voltage is developed at terminal 28c by conduction of transistor 28, capacitor 46 charges at a rate which is a function of resistor 48 and capacitor 46. When sufficient charge has been developed on capacitor 46 to fire transistor 44, a positive voltage is developed across resistor 52 and appears across terminals 42c and 42b.

The final circuit element in FIG. 3 is an SCR 54 having an anode terminal 54a connected to terminal 20b, a gate terminal 54g connected to terminal 42c and a cathode terminal 54c connected to terminal 10b. When time delay circuit 42 develops a positive voltage across terminals 42c and 42b, SCR 54 is rendered conductive to provide a low impedance path between terminals 20b and 10b. Thus, when energized, SCR 54 effectively short circuits alarm circuit 10.

Overall alarm system operation is now described for alarm circuit 10 connected with the horn circuit of a vehicle. The vehicle has a load circuit which is energized from the battery when one or more doors are opened. Alarm circuit 10 is preferably armed as follows. First, one or more doors are opened to energize the load circuit associated with the doors and also provide exit from the vehicle for the vehicle occupant or occupants. Then, switch 20 is closed. However, because the load circuit associated with the doors is energized, the closure of switch 20 at this time does not arm the alarm circuit. Therefore, the occupants have as much time as they desire to exit the vehicle without an alarm being given. This is because alarm circuit 10 can respond only to sudden drop in battery voltage created by initial energization of the load circuit; therefore, so long as any door remains open, the load circuit remains energized and the requisite battery voltage drop for energizing the alarm can not occur. However, once all doors are closed, the load circuit is disconnected from battery 12 and the system becomes armed. Subsequent opening of a door causes the load circuit to be energized, and this creates the sudden drop in battery voltage to which alarm circuit 10 is responsive. Thus, there is no need to select resistor 22 so as to provide a time delay in charging capacitor 26; in fact it is desirable to make resistor 22 as small as possible so that maximum current is available for detection circuit 27 and time delay circuit 42. (However, it will be appreciated that it would be possible to select resistor 22 and capacitor 26 to provide a time delay in charging capacitor 26 of perhaps 20 or 30 seconds. If this is done, it is unnecessary to open one of the doors before closing switch 20 provided that the door is opened within the 20 or 30 second delay period which occurs after switch 20 is closed. However, the inclusion of such a feature would require a relatively large resistor 22. Accordingly, other circuit modifications might be necessary. For example, different component values might be required for some or all the components of circuit 27 and/or circuit 42.)

Once capacitor 26 is sufficiently charged, the sudden battery drain caused by energization of the load circuit when an unauthorized intruder attempts to enter the vehicle momentarily drops the battery voltage so that a reverse voltage is developed across diode 24. This reverse voltage triggers detection circuit 27, which supplies a positive voltage input to time delay circuit 42. After the time delay imposed by circuit 42, SCR 54 is energized to short crcuit terminals 10a and 10b. The circuit path through SCR 54 enables the horn to be sounded either by directly energizing the horn (as in FIG. 2) or by energizing the horn relay to, in turn, energize the horn (as in FIG. 1). (Of course, the authorized individual will initiate the same sequence of events upon re-entering the vehicle; however, he will customarily turn off the alarm switch before the horn is sounded.) Where it is desired to use a separate alarm other than the horn, terminals 10a and 10b could be connected directly across battery 12 provided that SCR 54 was disconnected from one or both terminals 20b, 10b. The signal developed across terminals 42c and 42b could be used to initiate the separate alarm. It is to be noted also that when alarm circuit 10 is connected as in FIG. 2, resistor 18 prevents interruption of current from battery 12 to the individual elements in alarm circuit 10 when the circuit through the horn is intermittently interrupted. Thus, a bleed current is maintained through SCR 54 and the possibility of alarm circuit 10 unlatching is precluded. Hence, the horn continues to sound.

FIG. 4 illustrates an alternate embodiment of the invention wherein like components are designated by like numerals. The operation of the circuit of FIG. 4 is essentially similar to that of FIG. 3. However, one difference is that no delay time exists between the development of reverse voltage across diode 24 and the actuation of alarm 16. Thus, switch 20 is preferably a key-operated switch located externally of the vehicle interior which can be turned off by an authorized person before entering the vehicle to avoid generation of a spurious alarm signal. The circuit of FIG. 4 requires fewer circuit elements and in particular eliminates the need to have SCR 54 by affording two possible connections of alarm 16. A first possible connection of alarm 16 is illustrated in solid lines in FIG. 4. Alarm terminal 16a is connected to the junction of terminals 20b and 22a while alarm terminal 16b is connected to terminal 30c of transistor 30. When transistor 30 conducts in response to detection of reverse voltage across diode 24, transistor 30 effectively couples alarm 16 directly across terminals 10a and 10b. Hence, alarm 16 in this instance can be either the existing horn or horn relay. The connection of alarm 16 illustrated in broken lines in FIG. 4 represents another possible connection. When transistor 28 conducts in response to detection of reverse voltage across diode 24, alarm 16 is coupled via resistor 22 and diode 24 across terminals 10a and 10b. With alarm 16 connected this way, it is desirable to have resistor 22 as small as possible since current for actuating the alarm must be drawn through resistor 22. Accordingly, when the resistance of the circuit between battery 12 and capacitor 26 not including resistor 22 is sufficiently large to limit charging current to capacitor 26 to an acceptable value, resistor 22 could be omitted. However, if resistor 22 were used, it would be preferable not to have alarm 16 be either the horn or the horn relay already used with battery 12 since sufficient current could likely not be drawn through resistor 22 to actuate alarm 16. By suitable selection of resistor 22, alarm 16 could be either a horn or horn relay which operates at a voltage less than battery voltage (i.e., a 6v. horn or horn relay if battery 12 is 12v.).

The two illustrated embodiments of alarm circuit 10 achieve the aforementioned object of being substantially insensitive to temperature variation. In this regard, it will be observed that since neither transistor 28 nor transistor 30 is biased to its amplifying or saturation region, changes which affect the transistor gain (i.e., beta) of the individual transistors are not critical. Thus, the possibility of a spurious alarm signal being generated due to changes in ambient temperature is precluded. However, the invention achieves suitable detection sensitivity because during monitoring, capacitor 26 is charged to substantially full battery voltage and maintained at this voltage by diode 24. Accordingly the capacitor voltage can be used as a reference against which the instantaneous battery voltage is measured to detect sudden battery drop by detecting reverse voltage across diode 24. Considering these along with the other advantages already detailed (i.e., zero power consumption during monitoring; substantially fool-proof, rapid, reliable operation; and compatability with virtually all conventional vehicle horn systems) it will be perceived that the disclosure provides an alarm circuit admirably suited to reliably warn against intruders.

I claim:

1. An intrusion alarm circuit adapted for connection with an electrical system of the type wherein one or more load circuits are energized from a battery when intrusion is attempted to thereby cause sudden drop in battery voltage, said alarm circuit comprising terminal means adapted for connection with the electrical system to couple the electrical system battery with said alarm circuit, said alarm circuit comprising capacitor means, coupling circuit means for coupling said capacitor means to said terminal means, said coupling circuit means comprising a circuit element through which charging current is conducted from the electrical system battery to said capacitor means when said terminal means are connected to the electrical system for charging said capacitor means to approximately battery voltage, said circuit element being operative after said capacitor means is charged to sufficiently isolate said capacitor means from the electrical system battery that said capacitor means is prevented from following sudden drop in voltage of the electrical system battery to thereby develop a voltage signal across said circuit element, and detection circuit means operatively coupled with said circuit element and responsive to said voltage signal for producing an alarm signal indicating intrusion.

2. The combination of claim 1 wherein said circuit element comprises a diode having an anode terminal and a cathode terminal, said voltage signal being developed as a reverse voltage across said diode.

3. The combination of claim 2 wherein said detection circuit means comprises a bi-stable circuit operative upon occurrence of said voltage signal from a first stable state to a second stable state.

4. The combination of claim 3 wherein said bi-stable circuit comprises a transistor having an input and an output, means coupling said transistor input with said diode for causing said transistor to be operated in response to said voltage signal to thereby cause said alarm signal to be developed at the output of said transistor and regenerative circuit means operatively coupling said transistor output with said transistor input and responsive to said alarm signal for causing said transistor to be maintained in its operated state.

5. The combination of claim 4 wherein the input of said transistor comprises the base-emitter circuit thereof, with said base-emitter circuit being connected across said diode.

6. The combination of claim 5 wherein the emitter of said transistor is coupled to the cathode of said diode and the base terminal of said transistor is coupled to the anode of said diode.

7. The combination of claim 4 wherein said regenerative circuit means comprises an additional transistor having an input and an output, the input of said additional transistor being coupled to the output of said first-mentioned transistor and the output of said additional transistor being coupled to the input of said first-mentioned transistor.

8. The combination of claim 7 wherein the input of said first-mentioned transistor comprises the base-emitter circuit thereof, with said base-emitter circuit being connected across said diode, said additional transistor comprising a base terminal coupled to the collector of said first-mentioned transistor and an emitter-collector circuit coupled with the base of said first-mentioned transistor such that when said first-mentioned transistor is operated in response to said voltage signal said additional transistor is subsequently operated to maintain said first-mentioned transistor in its operated state.

9. The combination of claim 2 wherein the cathode terminal of said diode is connected to said capacitor means and the anode terminal of said diode is adapted for connection with the positive terminal of the electrical system battery.

10. The combination of claim 9 wherein said coupling circuit means includes resistance means connected in series with said diode and said capacitor means for limiting the magnitude of charging current to said capacitor means.

11. The combination of claim 10 wherein said alarm circuit includes time-delay circuit means for delaying said alarm signal a preselected time interval after occurrence of said voltage signal.

12. An intrusion alarm circuit adapted for connection with an electrical system of the type wherein one or more load circuits are energized from a battery when intrusion is attempted to thereby cause sudden drop in battery voltage, said alarm circuit comprising a pair of terminals adapted for connection with the electrical system to couple the battery thereacross, said alarm circuit comprising a diode, a capacitor, means coupling said diode and said capacitor in series with each other between said terminals and across the battery and detection circuit means for detecting sudden drop in battery voltage comprising a first terminal connected between one terminal of said diode and one terminal of said capacitor, a second terminal connected between the other terminal of said diode and one terminal of said pair of terminals and a third terminal connected between the other terminal of said capacitor and the other terminal of said pair of terminals, said diode initially conducting charging current from the battery to said capacitor for charging the capacitor to approximately battery voltage and thereafter preventing discharge of said capacitor through said diode so that reverse voltage is developed across said diode upon sudden drop in battery voltage, said detection circuit means comprising circuit element means responsive to said reverse voltage for causing an alarm signal to be generated.

13. The combination of claim 12 wherein said circuit element means comprises means responsive to said reverse voltage for iniitally causing current to flow from said capacitor via said first terminal through said detection circuit means via second terminal to the battery and said detection circuit means includes means responsive to said last-mentioned current for causing the alarm signal to be generated.

14. The combination of claim 13 wherein said circuit element means comprises a transistor having terminals connected across said diode.

15. The combination of claim 14 wherein the base-emitter circuit of said transistor is connected across said diode.

16. The combination of claim 12 wherein said circuit element means comprises means responsive to said reverse voltage for initially causing current to flow from said capacitor via said first terminal into said detection circuit means, said last-mentioned current dividing within said circuit element means into a first current portion which flows via said second terminal to the battery and a second current portion which flows via said third terminal back to said capacitor, said detection circuit means including means responsive to said second current portion for causing the alarm signal to be generated.

17. The combination of claim 16 wherein said circuit element means comprises a transistor having terminals connected across said diode.

18. The combination of claim 17 wherein the base-emitter circuit of said transistor is connected across said diode.

19. The combination of claim 18 wherein said means responsive to said second current portion comprises resistance means operatively coupled between the collector terminal of said transistor and said capacitor, said second current portion causing a voltage signal to be developed across said resistance means for causing the alarm signal to be generated.

20. The combination of claim 19 including regenerative circuit means operatively coupling said resistance means with the base of said transistor, said regenerative circuit means being responsive to the voltage signal developed across said resistance means for causing said transistor to remain conductive so that current to said transistor via said first terminal changes from from said capacitor to from the battery after the voltage across said capacitor falls below a selected level.

21. The combination of claim 20 wherein said regenerative circuit means comprises a transistor which conducts in response to said voltage signal.

22. In an alarm system having an alarm device through which an intermittent current path exists during actuation thereof, said alarm system being of the type having a battery and one or more load circuits energized by the battery when intrusion is attempted to thereby cause sudden drop in battery voltage, an alarm circuit for said system adapted to be connected across the battery, said alarm circuit comprising a detection circuit adapted to be connected in series with the alarm device and a shunt circuit adapted to be connected in shunt with the alarm device, said detection circuit being responsive to sudden drop in battery voltage for actuating the alarm device and said shunt circuit maintaining current flow through said detection circuit during interruption of the current path through the alarm device.

23. The combination of claim 22 wherein said shunt circuit comprises resistance means.

* * * * *